United States Patent
Shuto et al.

(10) Patent No.: US 10,794,428 B2
(45) Date of Patent: Oct. 6, 2020

(54) SEALING DEVICE AND HUB BEARING

(71) Applicant: NOK CORPORATION, Tokyo (JP)

(72) Inventors: Yuichi Shuto, Fukushima (JP); Kei Sasaki, Fukushima (JP); Shohei Yamane, Fukushima (JP); Yuichi Tarukawa, Fukushima (JP); Takuya Kato, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/463,606

(22) PCT Filed: Nov. 24, 2017

(86) PCT No.: PCT/JP2017/042171
§ 371 (c)(1),
(2) Date: May 23, 2019

(87) PCT Pub. No.: WO2018/097233
PCT Pub. Date: May 31, 2018

(65) Prior Publication Data
US 2019/0277340 A1 Sep. 12, 2019

(30) Foreign Application Priority Data

Nov. 25, 2016 (JP) .................................. 2016-229416

(51) Int. Cl.
*F16C 33/78* (2006.01)
*F16C 19/18* (2006.01)
(Continued)

(52) U.S. Cl.
CPC .......... *F16C 33/7823* (2013.01); *F16C 19/18* (2013.01); *F16C 33/58* (2013.01);
(Continued)

(58) Field of Classification Search
CPC .............. F16C 33/7823; F16C 33/7826; F16C 33/7853; F16C 33/7876; F16C 33/7883; F16J 15/3232
See application file for complete search history.

(56) References Cited

U.S. PATENT DOCUMENTS

| 4,399,998 A | 8/1983 | Otto |
| 5,511,886 A | 4/1996 | Sink |

(Continued)

FOREIGN PATENT DOCUMENTS

| CN | 101952624 A | 1/2011 |
| CN | 102933864 A | 2/2013 |

(Continued)

OTHER PUBLICATIONS

Chinese Office Action dated Feb. 3, 2020 (corresponding to 201780072806.3).

(Continued)

*Primary Examiner* — Phillip A Johnson
(74) *Attorney, Agent, or Firm* — Harness, Dickey & Pierce, P.L.C.

(57) ABSTRACT

There are provided a sealing device and a hub bearing that can reduce torque. Pear-skin-like projections and depressions are provided on each of a sliding surface in a lip for foreign object (a side lip 121*a* and a middle lip 121*b*) and a sliding surface in a lip for grease 122. Roughness of the pear-skin-like projections and depressions provided on the sliding surface of the lip for grease 122 is larger than roughness of the pear-skin-like projections and depressions provided on the sliding surface of the lip for foreign object.

11 Claims, 7 Drawing Sheets

(51) Int. Cl.
*F16C 33/80* (2006.01)
*F16J 15/3232* (2016.01)
*F16C 33/58* (2006.01)
*F16C 33/66* (2006.01)

(52) U.S. Cl.
CPC .............. *F16C 33/66* (2013.01); *F16C 33/78* (2013.01); *F16C 33/80* (2013.01); *F16J 15/3232* (2013.01); *F16C 2326/02* (2013.01)

(56) References Cited

U.S. PATENT DOCUMENTS

| | | | |
|---|---|---|---|
| 8,267,591 B2 * | 9/2012 | Baba | B60B 27/0073 384/486 |
| 2004/0017048 A1 * | 1/2004 | Katogi | F16C 33/7876 277/549 |
| 2010/0129018 A1 | 5/2010 | Shigeoka | |
| 2011/0262069 A1 | 10/2011 | Baba et al. | |

FOREIGN PATENT DOCUMENTS

| | | | | |
|---|---|---|---|---|
| CN | 104246323 A | | 12/2014 | |
| JP | S62-171520 A | | 7/1987 | |
| JP | H01-058864 U | | 4/1989 | |
| JP | H01-083966 U | | 6/1989 | |
| JP | H09-042461 A | | 2/1997 | |
| JP | 2004019779 A | * | 1/2004 | .......... F16C 33/7853 |
| JP | 2008-069882 A | | 3/2008 | |
| JP | 2008-298106 A | | 12/2008 | |
| JP | 2010-159791 A | | 7/2010 | |
| JP | 2010-185491 A | | 8/2010 | |
| JP | 2010-531966 A | | 9/2010 | |
| JP | 2012-021616 A | | 2/2012 | |
| JP | 2012167764 A | * | 9/2012 | .......... F16C 33/7853 |
| JP | 2013018338 A | | 1/2013 | |
| JP | 2013-124764 A | | 6/2013 | |
| JP | 2015-105688 A | | 6/2015 | |
| JP | 2015224746 A | | 12/2015 | |
| JP | 2016205564 A | * | 12/2016 | .......... F16C 33/7863 |
| WO | 2012127895 A1 | | 9/2012 | |
| WO | 2016125762 A1 | | 8/2016 | |

OTHER PUBLICATIONS

Extended European Search Report dated Jun. 24, 2020 (corresponding to EP 17872919.0).

* cited by examiner

SEALING DEVICE AND HUB BEARING

CROSS-REFERENCE TO RELATED APPLICATIONS

This application is a National Stage of International Application No. PCT/JP2017/042171, filed Nov. 24, 2017 (now WO 2018/097233A1), which claims priority to Japanese Application No. 2016-229416, filed Nov. 25, 2016. The entire disclosures of each of the above applications are incorporated herein by reference.

FIELD

The present disclosure relates to a sealing device provided in a hub bearing and a hub bearing.

BACKGROUND

A hub bearing installed in an automobile is provided with sealing devices on each of a car body side and a tire side. Each of the sealing devices seals an annular gap between an inner ring and an outer ring provided in the hub bearing. The sealing device includes a lip for foreign object configured to prevent entry of a foreign object from the outside and a lip for grease configured to prevent leakage of grease. The lip for foreign object and the lip for grease are slidable on the inner ring or a slinger fixed to the inner ring.

When the hub bearing is assembled, air can be trapped in a space between the sealing device on the car body side and the sealing device on the tire side, pressure in the space is increased, and the lip for grease is tightly pressed against the inner ring or the slinger fixed to the inner ring. This can prevent the air in the space from escaping to the outside.

In addition, a surface of the inner ring or the slinger fixed to the inner ring has a spiral machining mark formed during polishing. This causes what is called a pumping effect when the lip slides on the inner ring which rotates relative to the outer ring, and then fluid in a sliding area of the lip moves in a direction depending on a rotation direction. In view of this, the spiral machining mark is typically formed such that a foreign object moves in a discharging direction to the outside when the inner ring rotates relative to the outer ring in a forward direction. Accordingly, when the inner ring rotates relative to the outer ring in the forward direction, gas in a sealed space between the lip for foreign object and the lip for grease is discharged to the outside. Thus, the gas in the sealed space is discharged to the outside from the sliding area of the lip for foreign object and, if air is not supplied from an inside space across the lip for grease, pressure in the sealed space becomes negative. Further, temperature may increase due to heat generation caused by sliding or the like, the gas in the sealed space may thereby thermally expand, and the gas in the sealed space may be discharged to the outside from the sliding area of the lip for foreign object. Also in this case, after decrease in the temperature, the gas in the sealed space contracts and the pressure in the sealed space becomes negative.

Thus, each lip is tightly pressed against the inner ring or the like due to an increase in the pressure in the space between the sealing device on the car body side and the sealing device on the tire side and the negative pressure in the sealed space between the lip for foreign object and the lip for grease. It has been found that this causes sliding torque to increase.

CITATION LIST

Patent Literature

[PTL 1] Japanese Patent Application Publication No. 2010-185491

SUMMARY

Technical Problem

An object of the present disclosure is to provide a sealing device and a hub bearing that can reduce sliding torque.

Solution to Problem

In order to solve the above problem, the present disclosure has adopted the following means.

That is, the sealing device of the present disclosure is a sealing device configured to seal an annular gap between an inner ring and an outer ring provided in a hub bearing, the sealing device including: a reinforcement ring configured to be fixed to the outer ring; a seal body that is provided integrally with the reinforcement ring and is made of an elastic body; and a plurality of seal lips provided in the seal body, the plurality of seal lips being slidable on the inner ring or a slinger fixed to the inner ring, wherein the plurality of seal lips include: a lip for foreign object configured to prevent entry of a foreign object which extends radially outward and is slidable on the inner ring or the slinger fixed to the inner ring; and a lip for grease configured to prevent leakage of grease which extends radially inward and is slidable on the inner ring or the slinger fixed to the inner ring; a sliding surface in the lip for foreign object and a sliding surface in the lip for grease have pear-skin-like projections and depressions on them; and roughness of the pear-skin-like projections and depressions provided on the sliding surface of the lip for grease is larger than roughness of the pear-skin-like projections and depressions provided on the sliding surface of the lip for foreign object.

The pear-skin-like projections and depressions are provided on each of the sliding surface in the lip for foreign object and the sliding surface in the lip for grease. This reduces sliding torque. In addition, the roughness of the pear-skin-like projections and depressions provided on the sliding surface of the lip for grease is larger than the roughness of the pear-skin-like projections and depressions provided on the sliding surface of the lip for foreign object. This causes gas to escape from an inside space across the lip for grease into a sealed space between the lip for foreign object and the lip for grease. Accordingly, pressure in the inside space across the lip for grease can be reduced. In addition, this prevents pressure in the sealed space between the lip for foreign object and the lip for grease from becoming negative. Consequently, it is possible to prevent each seal lip from being tightly pressed against the inner ring or the slinger fixed to the inner ring.

A ten-point average height of irregularities of the pear-skin-like projections and depressions provided on the sliding surface of the lip for grease may be larger than 10 μm.

Note that "the ten-point average height of irregularities" is based on JIS B0601: 1994. The same applies to the following description. It has been found that the pear-skin-like projections and depressions provided on the sliding surface of the lip for grease with the ten-point average height of irregularities larger than 10 μm allow gas to be supplied into the sealed space between the lip for foreign object and the lip for grease from the inside space across the lip for grease.

Another aspect of the present disclosure is a sealing device configured to seal an annular gap between an inner ring and an outer ring provided in a hub bearing, the sealing device including: a reinforcement ring configured to be fixed to the outer ring; a seal body that is provided integrally with the reinforcement ring and is made of an elastic body; and a plurality of seal lips provided in the seal body, the plurality of seal lips being slidable on the inner ring or a slinger fixed to the inner ring, wherein the plurality of seal lips include: a lip for foreign object configured to prevent entry of a foreign object which extends radially outward and is slidable on the inner ring or the slinger fixed to the inner ring; and a lip for grease configured to prevent leakage of grease which extends radially inward and is slidable on the inner ring or the slinger fixed to the inner ring; and a sliding surface in the lip for grease has pear-skin-like projections and depressions having a ten-point average height of irregularities larger than 10 μm.

It has been found that this allows gas to be supplied into the sealed space between the lip for foreign object and the lip for grease from the inside space across the lip for grease. This reduces the pressure in the inside space across the lip for grease. In addition, this prevents the pressure in the sealed space between the lip for foreign object and the lip for grease from becoming negative. Consequently, this prevents each seal lip from being tightly pressed against the inner ring or the slinger fixed to the inner ring.

Still another aspect of the present disclosure is a sealing device configured to seal an annular gap between an inner ring and an outer ring provided in a hub bearing, the sealing device including: a reinforcement ring fixed to the outer ring; a seal body that is provided integrally with the reinforcement ring and is made of an elastic body; a slinger fixed to the inner ring; and a plurality of seal lips provided in the seal body, the plurality of seal lips being slidable on the slinger, wherein the plurality of seal lips include: a lip for foreign object configured to prevent entry of a foreign object which extends radially outward and is slidable on the slinger; and a lip for grease configured to prevent leakage of grease which extends radially inward and is slidable on the slinger; a surface of the slinger has pear-skin-like projections and depressions in an area on which the lip for foreign object slides and in an area on which the lip for grease slides; and roughness of the pear-skin-like projections and depressions in the area on which the lip for grease slides is larger than roughness of the pear-skin-like projections and depressions in the area on which the lip for foreign object slides.

The surface of the slinger has the pear-skin-like projections and depressions in the area on which the lip for foreign object slides and in the area on which the lip for grease slides. This reduces sliding torque. In addition, the roughness of the pear-skin-like projections and depressions in the area on which the lip for grease slides is larger than the roughness of the pear-skin-like projections and depressions in the area on which the lip for foreign object slides. This causes gas to escape from the inside space across the lip for grease into the sealed space between the lip for foreign object and the lip for grease. This reduces the pressure in the inside space across the lip for grease. In addition, this prevents the pressure in the sealed space between the lip for foreign object and the lip for grease from becoming negative. Consequently, this prevents each seal lip from being tightly pressed against the slinger.

A ten-point average height of irregularities of the pear-skin-like projections and depressions in the area of the surface of the slinger on which the lip for grease slides may be larger than 10 μm.

It has been found that this allows gas to be supplied into the sealed space between the lip for foreign object and the lip for grease from the inside space across the lip for grease.

Still another aspect of the present disclosure is a sealing device configured to seal an annular gap between an inner ring and an outer ring provided in a hub bearing, the sealing device including: a reinforcement ring fixed to the outer ring; a seal body that is provided integrally with the reinforcement ring and is made of an elastic body; a slinger fixed to the inner ring; and a plurality of seal lips provided in the seal body, the plurality of seal lips being slidable on the slinger, wherein the plurality of seal lips include: a lip for foreign object configured to prevent entry of a foreign object which extends radially outward and is slidable on the slinger; and a lip for grease configured to prevent leakage of grease which extends radially inward and is slidable on the slinger; and a surface of the slinger has pear-skin-like projections and depressions in an area on which the lip for grease slides, the pear-skin-like projections and depressions having a ten-point average height of irregularities larger than 10 μm.

It has been found that this allows gas to be supplied into the sealed space between the lip for foreign object and the lip for grease from the inside space across the lip for grease. This reduces the pressure in the inside space across the lip for grease. In addition, this prevents the pressure in the sealed space between the lip for foreign object and the lip for grease from becoming negative. Consequently, this prevents each seal lip from being tightly pressed against the slinger.

The hub bearing of the present disclosure is a hub bearing including: an inner ring; an outer ring; and a sealing device configured to seal an annular gap between the inner ring and the outer ring, wherein the sealing device includes: a reinforcement ring that is fixed to the outer ring; a seal body that is provided integrally with the reinforcement ring and is made of an elastic body; and a plurality of seal lips provided in the seal body, the plurality of seal lips being slidable on the inner ring, wherein the plurality of seal lips include: a lip for foreign object configured to prevent entry of a foreign object which extends radially outward and is slidable on the inner ring; and a lip for grease configured to prevent leakage of grease which extends radially inward and is slidable on the inner ring; a surface of the inner ring has pear-skin-like projections and depressions in an area on which the lip for foreign object slides and in an area on which the lip for grease slides; and roughness of the pear-skin-like projections and depressions in the area on which the lip for grease slides is larger than roughness of the pear-skin-like projections and depressions in the area on which the lip for foreign object slides.

The surface of the inner ring has the pear-skin-like projections and depressions in the area on which the lip for foreign object slides and in the area on which the lip for grease slides. This reduces sliding torque. In addition, the roughness of the pear-skin-like projections and depressions in the area on which the lip for grease slides is larger than the roughness of the pear-skin-like projections and depressions in the area on which the lip for foreign object slides. This causes gas to escape from the inside space across the lip for grease into the sealed space between the lip for foreign object and the lip for grease. This reduces the pressure in the inside space across the lip for grease. In addition, this prevents the pressure in the sealed space between the lip for foreign object and the lip for grease from becoming negative. Consequently, this prevents each seal lip from being tightly pressed against the inner ring.

A ten-point average height of irregularities of the pear-skin-like projections and depressions in the area of the surface of the inner ring on which the lip for grease slides may be larger than 10 μm.

It has been found that this allows gas to be supplied into the sealed space between the lip for foreign object and the lip for grease from the inside space across the lip for grease.

Still another aspect of the present disclosure is a hub bearing including: an inner ring; an outer ring; and a sealing device configured to seal an annular gap between the inner ring and the outer ring, wherein the sealing device includes: a reinforcement ring that is fixed to the outer ring; a seal body that is provided integrally with the reinforcement ring and is made of an elastic body; and a plurality of seal lips provided in the seal body, the plurality of seal lips being slidable on the inner ring, wherein the plurality of seal lips include: a lip for foreign object configured to prevent entry of a foreign object which extends radially outward and is slidable on the inner ring; and a lip for grease configured to prevent leakage of grease which extends radially inward and is slidable on the inner ring; and a surface of the inner ring has pear-skin-like projections and depressions in an area on which the lip for grease slides, the pear-skin-like projections and depressions having a ten-point average height of irregularities larger than 10 μm.

It has been found that this allows gas to be supplied into the sealed space between the lip for foreign object and the lip for grease from the inside space across the lip for grease. This reduces the pressure in the inside space across the lip for grease. In addition, this prevents the pressure in the sealed space between the lip for foreign object and the lip for grease from becoming negative. Consequently, this prevents each seal lip from being tightly pressed against the inner ring.

Advantageous Effects of the Disclosure

As described above, the present disclosure can reduce sliding torque.

DRAWINGS

DETAILED DESCRIPTION

Hereinbelow, with reference to the drawings, modes for carrying out the disclosure will be described in detail based on embodiments illustratively. It should be noted that, however, unless otherwise described specifically, the dimensions, materials, shapes, and relative arrangements of components described in the embodiments are not intended to limit the scope of the present disclosure to the dimensions, materials, shapes, and relative arrangements thereof.

(Hub Bearing)

Figure 1:
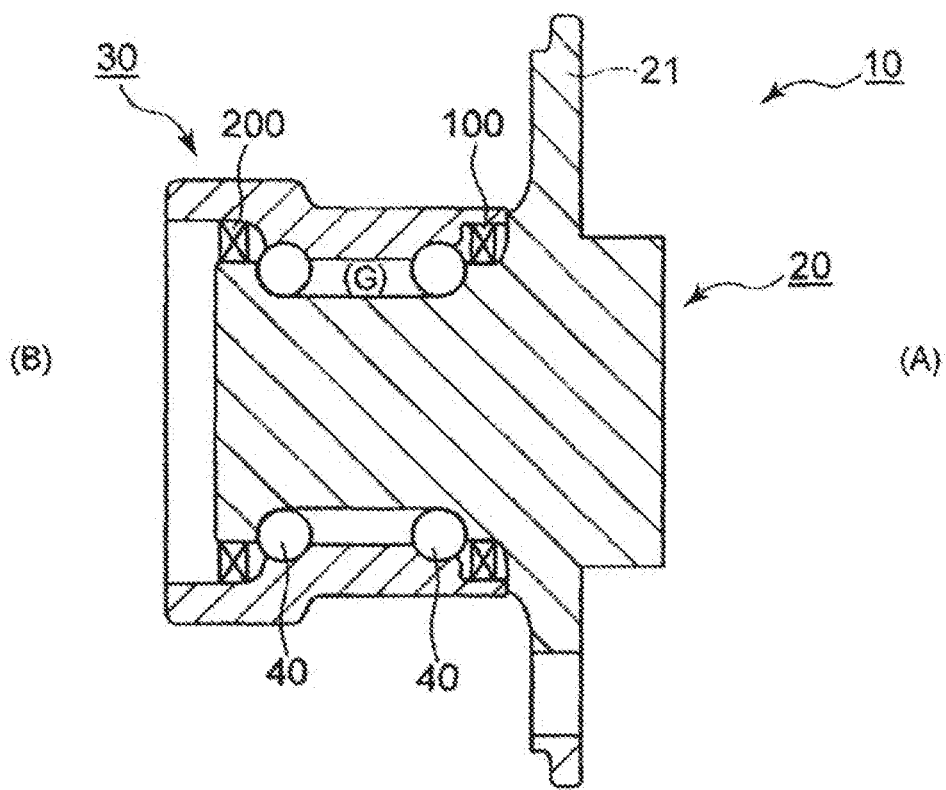
FIG. 1 is a schematic cross-sectional view of a hub bearing according to an embodiment of the present disclosure.

A hub bearing to which a sealing device is applied will be described with reference to FIG. 1. FIG. 1 is a schematic cross-sectional view of a hub bearing. FIG. 1 shows a cross-sectional view obtained by cutting the hub bearing by a plane including the central axis of rotation of an inner ring.

An automobile includes a hub bearing 10. The hub bearing 10 includes an inner ring (shaft) 20, an outer ring (housing) 30 that are rotatable relative to each other, and a plurality of balls 40 that are provided between the inner ring 20 and the outer ring 30. A tire (not shown) is fixed to the inner ring 20 side. The outer ring 30 is mounted to a car body side. Hereinafter, for the convenience of description, the right side in FIG. 1 is referred to as a tire side (A) and the left side therein is referred to as a car body side (B). The inner ring 20 has an outward flange portion 21 for mounting the tire on the tire side (A). In addition, in order to prevent entry of a foreign object (muddy water, garbage, or the like) into the hub bearing 10 from the outside and prevent leakage of grease (G) serving as lubricant from the inside, sealing devices 100 and 200 that seal an annular gap between the inner ring 20 and the outer ring 30 are provided. The sealing device 100 on the tire side (A) may be referred to as an outer seal and the sealing device 200 on the car body side (B) may be referred to as an inner seal.

The sealing device 100 on the tire side (A) and the sealing device 200 on the car body side (B) may adopt basically the same configuration. Note that each of the sealing devices 100 and 200 provided in the hub bearing 10 has a seal lip that slides on an end surface of a member that rotates together with the inner ring 20 such that the foreign object or the like is easily discharged to the outside by a centrifugal force as the inner ring 20 rotates. The sealing device 100 on the tire side may be provided with a seal lip that slides on the outward flange portion 21. On the other hand, the sealing device 200 on the car body side (B) may be typically provided with a slinger (annular member) in order to provide a portion corresponding to the outward flange portion 21. Thus, the sealing devices 100 and 200 are different from each other in that, while the slinger is usually required in the sealing device 200 on the car body side (B), the slinger is not necessarily required in the sealing device 100 on the tire side (A).

Embodiment 1

Figure 2:
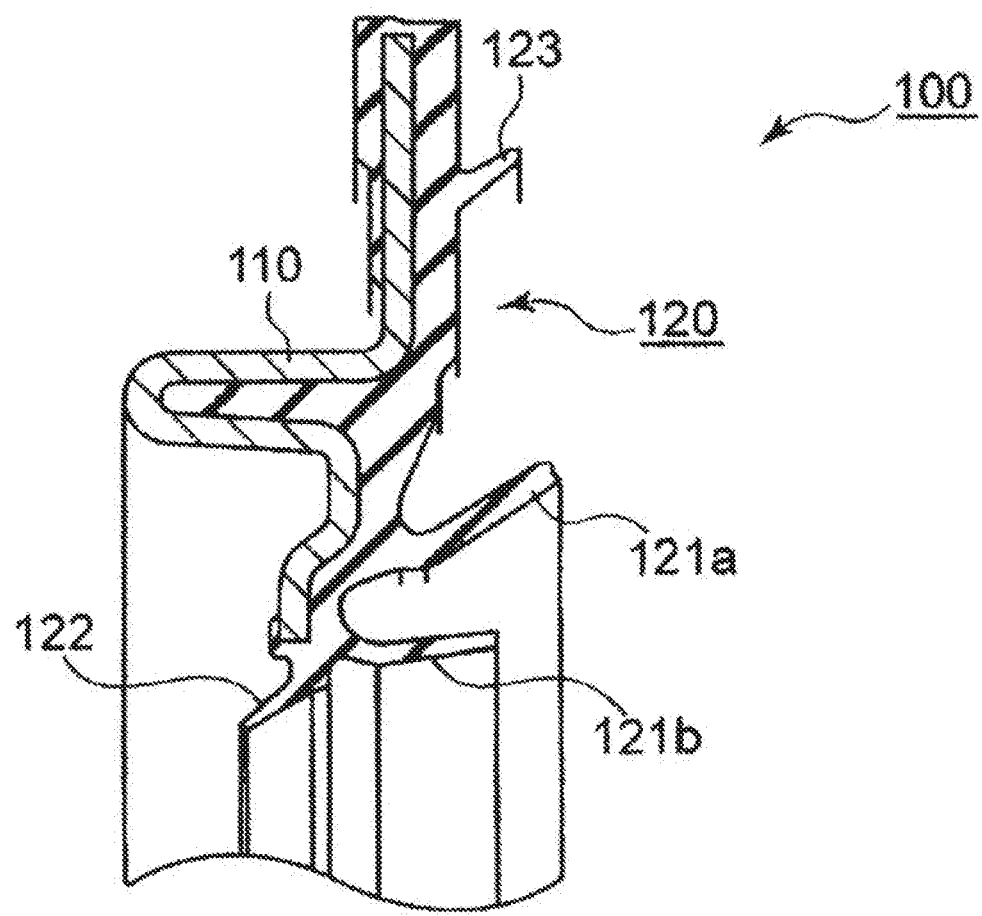
FIG. 2 is a part of a schematic cross-sectional view of a sealing device according to Embodiment 1 of the present disclosure.
Figure 3:
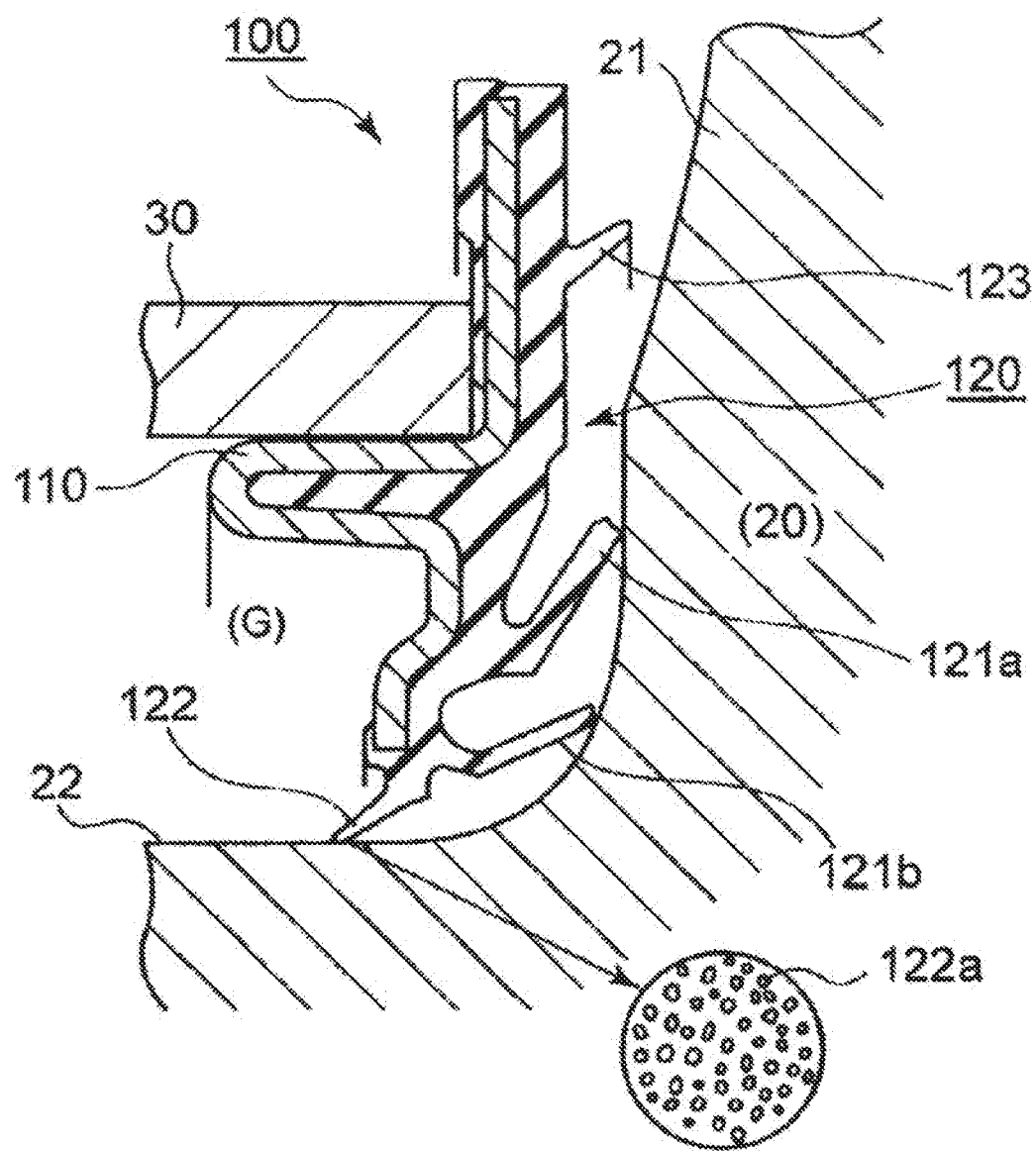
FIG. 3 is a partially enlarged view of a schematic cross-sectional view of the hub bearing to which the sealing device according to Embodiment 1 of the present disclosure is applied.
Figure 4:
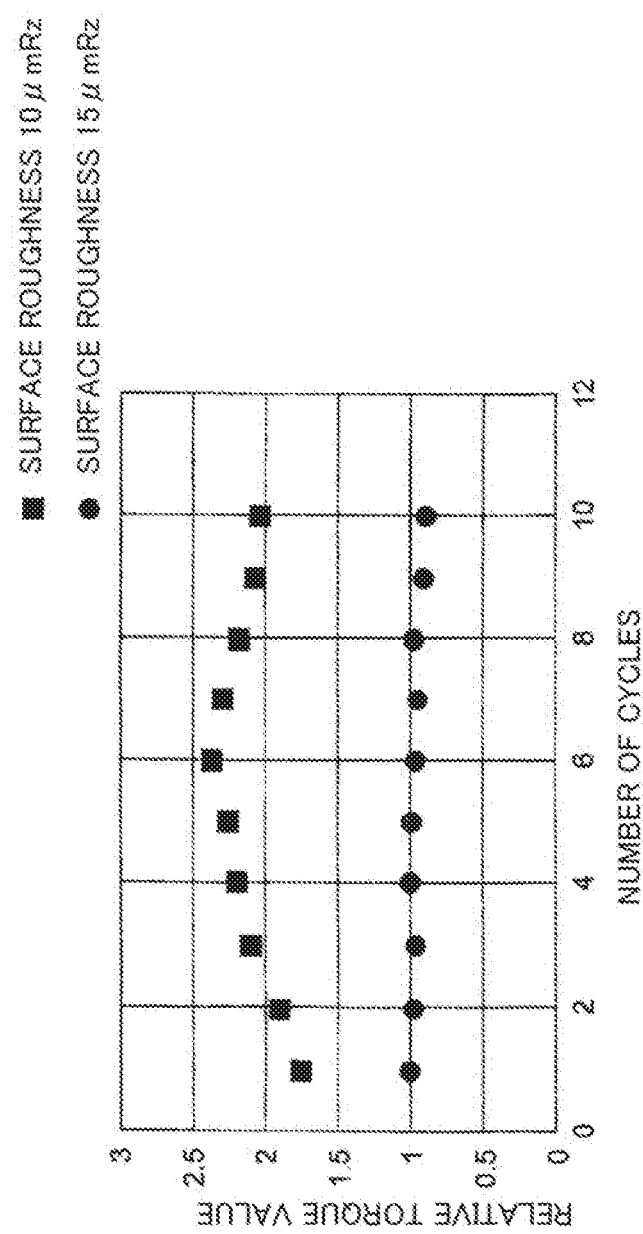
FIG. 4 is a graph showing a relationship between the number of cycles and a torque relative value.

The sealing device and the hub bearing will be described with reference to FIGS. 2 to 4. FIG. 2 is a part of a schematic cross-sectional view of the sealing device. FIG. 3 is a partially enlarged view of a schematic cross-sectional view of the hub bearing to which the sealing device is applied. FIGS. 2 and 3 show cross-sectional views obtained by cutting the sealing device and the hub bearing by a plane including the central axis of rotation of the inner ring. FIG. 4 is a graph showing a relationship between the number of cycles and a torque relative value.

A description about the sealing device 100 on the tire side (A) will be given as an example. The sealing device 100 has a reinforcement ring 110 that is fixed to the outer ring 30 and a seal body 120 that is provided integrally with the reinforcement ring 110 and is made of an elastic body. The reinforcement ring 110 is configured to be fixed to an inner peripheral surface of the outer ring 30 by fitting (see FIG. 3).

The seal body 120 has a plurality of seal lips that are slidable on the inner ring 20. The plurality of seal lips include a lip for foreign object for preventing entry of a foreign object and a lip for grease (lip for lubricant) 122 for preventing leakage of grease (G). The lip for foreign object has a side lip 121a and a middle lip 121b that is provided between the side lip 121a and the lip for grease 122. Each of the side lip 121a and the middle lip 121b that serve as the lip for foreign object extends radially outward and is slidable on the inner ring 20. The side lip 121a is slidable on an end surface of the outward flange portion 21 in the inner ring 20 and the middle lip 121b is slidable on a curved surface between an outer peripheral surface 22 and the outward flange portion 21 of the inner ring 20. The lip for grease 122 extends radially inward and is slidable on the outer peripheral surface 22 of the inner ring 20.

The seal body 120 has a labyrinth seal 123 in a radially outside space across the side lip 121a. The labyrinth seal 123 is configured not to slide on the inner ring 20. Between the labyrinth seal 123 and the end surface of the outward flange portion 21 in the inner ring 20 is formed a small gap. The labyrinth seal 123 does not cause sliding torque. The labyrinth seal 123 prevents the entry of the foreign object such as muddy water.

The seal body 120 has pear-skin-like projections and depressions on each of a sliding surface in the lip for foreign object (the side lip 121a and the middle lip 121b) and a sliding surface in the lip for grease 122. Pear-skin-like projections and depressions 122a provided on the sliding surface of the lip for grease 122 are schematically shown in a circle in FIG. 3. The pear-skin-like projections and depressions are projections and depressions that are randomly disposed, which are obtained by electrical discharge machining or blast machining. The pear-skin-like projections and depressions may be produced by directly machining an object. The pear-skin-like projections and depressions provided on the seal body 120 may be produced with high productivity by using a mold for molding the seal body 120 which is provided with pear-skin-like projections and depressions on its surface.

The roughness of the pear-skin-like projections and depressions 122a provided on the sliding surface of the lip for grease 122 is larger than the roughness of the pear-skin-like projections and depressions provided on the sliding surface of the lip for foreign object. Specifically, the ten-point average height of irregularities of the pear-skin-like projections and depressions provided on the sliding surface of the lip for foreign object is 10 µm. Note that "the ten-point average height of irregularities" is based on JIS B0601: 1994. The same applies to the following description. The ten-point average height of irregularities of the pear-skin-like projections and depressions 122a provided on the sliding surface of the lip for grease 122 is larger than 10 µm. Note that it is difficult to control the ten-point average height of irregularities of the pear-skin-like projections and depressions in the order of µm due to limitation of fabrication method. In view of this, the ten-point average height of irregularities of the pear-skin-like projections and depressions 122a provided on the sliding surface of the lip for grease 122 is 15 µm or larger. Note that the upper limit of the ten-point average height of irregularities of the pear-skin-like projections and depressions 122a is about 60 µm from the viewpoint of the fabrication method or the like. However, the ten-point average height of irregularities of the pear-skin-like projections and depressions 122a provided on the sliding surface of the lip for grease 122 may be larger than 60 µm as long as the lip for grease 122 can prevent the leakage of the grease, which is its intended function.

<Advantages of Sealing Device According to Present Embodiment and Hub Bearing>

The pear-skin-like projections and depressions are provided on each of the sliding surface in the lip for foreign object (the side lip 121a and the middle lip 121b) of the seal body 120 and the sliding surface in the lip for grease 122 thereof in the sealing device 100 and the hub bearing 10. This can reduce sliding torque.

The roughness of the pear-skin-like projections and depressions 122a provided on the sliding surface of the lip for grease 122 is larger than the roughness of the pear-skin-like projections and depressions provided on the sliding surface of the lip for foreign object. This can cause gas to escape from an inside space across the lip for grease 122 into a sealed space between the lip for foreign object and the lip for grease 122. This can reduce pressure in the inside space across the lip for grease 122. This can prevent pressure in the sealed space between the lip for foreign object and the lip for grease 122 from becoming negative. Consequently, this can prevent each seal lip from being tightly pressed against the inner ring 20. A test result related to this will be described.

A comparison test for measuring change of torque was conducted on the sealing device 100 and a sealing device of a comparative example. The basic configuration of the sealing device 100 is identical to that of the sealing device of the comparative example. The ten-point average height of irregularities of the pear-skin-like projections and depressions provided on the sliding surface in the lip for foreign object (the side lip 121a and the middle lip 121b) of the seal body 120 was set to 10 µm both for the sealing device 100 and for the sealing device of a comparative example. In contrast to this, the ten-point average height of irregularities of the pear-skin-like projections and depressions 122a provided on the sliding surface of the lip for grease 122 of the sealing device 100 was set to 15 µm, while that of the sealing device of a comparative example was set to 10 µm.

Average values of sliding torque were measured in multiple cycles of operation in which the inner ring 20 was rotated for 60 minutes while the RPM was changed in two stages (rotation at 1000 rpm after a running-in at 100 rpm). A graph in FIG. 4 illustrates the change of torque relative to the average value of the torque in the first cycle of the operation conducted on the sealing device 100. Circles in the graph represent values measured on the sealing device 100 (the ten-point average height of irregularities of the pear-skin-like projections and depressions 122a provided on the sliding surface of the lip for grease 122 is 15 µm) Boxes in the graph represent values measured on the comparative example (the ten-point average height of irregularities is 10 µm).

The graph in FIG. 4 shows that there is little change in the torque of the sealing device 100 with increase in cycles. In contrast to this, the torque of the sealing device of the comparative example is high even in the first cycle and, as the number of cycles increases, the torque begins to increase. This may be caused by an increase in a pressing force that pressed each seal lip against the inner ring due to high pressure in the inside space across the lip for grease which was kept high and gradual decrease in the pressure in the sealed space between the lip for foreign object and the lip for grease.

Note that, it is difficult to control the ten-point average height of irregularities of the pear-skin-like projections and depressions in the order of μm due to limitation of the fabrication method. It is technically difficult to perform similar comparisons by varying the ten-point average height of irregularities of the pear-skin-like projections and depressions 122a provided on the sliding surface of the lip for grease 122 in the order of μm. However, the similar effect is expected to be obtained if the ten-point average height of irregularities of the pear-skin-like projections and depressions 122a is larger than 10 μm (e.g., 12 or 13 μm).

Further, the similar effect is expected to be obtained if the ten-point average height of irregularities of the pear-skin-like projections and depressions 122a provided on the sliding surface of the lip for grease 122 is larger than 10 μm and the ten-point average height of irregularities of the pear-skin-like projections and depressions provided on the sliding surface in the lip for foreign object (the side lip 121a and the middle lip 121b) is equal to that of the lip for grease.

Embodiment 2

Figure 5:
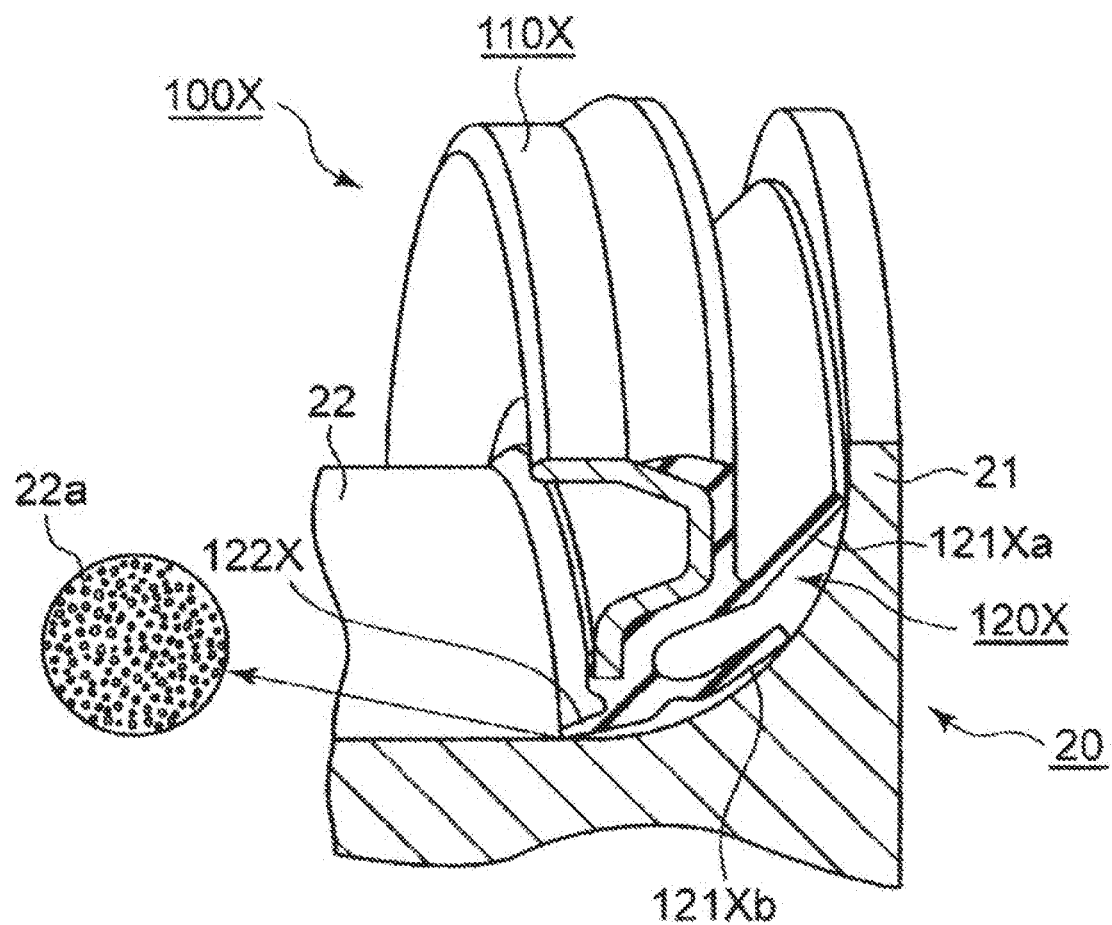
FIG. 5 is a partially cutaway perspective view of the hub bearing to which the sealing device according to Embodiment 2 of the present disclosure is applied.

FIG. 5 illustrates Embodiment 2 of the present disclosure. The present embodiment relates to a configuration where the pear-skin-like projections and depressions are provided on the inner ring, while above described Embodiment 1 relates to a configuration where the pear-skin-like projections and depressions are provided on the seal lip of the seal body.

The overall configuration of the hub bearing is same as above described embodiment and hence further explanation will be omitted. FIG. 5 is a partially cutaway perspective view of the hub bearing to which the sealing device of Embodiment 2 is applied. Note that, in FIG. 5, the outer ring is omitted in order for easy understanding of the configuration of the sealing device. A description about a sealing device 100X on the tire side (A), which is one of a pair of sealing devices provided in the hub bearing, will be given as an example (see FIG. 1). The sealing device 100X has a reinforcement ring 110X that is fixed to the outer ring and a seal body 120X that is provided integrally with the reinforcement ring 110X and is made of an elastic body. The reinforcement ring 110X is configured to be fixed to the inner peripheral surface of the outer ring by fitting.

The seal body 120X has a plurality of seal lips that are slidable on the inner ring 20. The plurality of seal lips include the lip for foreign object for preventing the entry of the foreign object and a lip for grease 122X for preventing the leakage of the grease. The lip for foreign object has a side lip 121Xa and a middle lip 121Xb that is provided between the side lip 121Xa and the lip for grease 122X. Each of the side lip 121Xa and the middle lip 121Xb serving as the lip for foreign object extends radially outward and is slidable on the inner ring 20. The side lip 121Xa is slidable on the end surface of the outward flange portion 21 in the inner ring 20 and the middle lip 121Xb is slidable on the curved surface between the outer peripheral surface 22 and the outward flange portion 21 of the inner ring 20. The lip for grease 122X extends radially inward and is slidable on the outer peripheral surface 22 of the inner ring 20.

A surface of the inner ring 20 has the pear-skin-like projections and depressions in an area on which the lip for foreign object (the side lip 121Xa and the middle lip 121Xb) slides and an area on which the lip for grease 122X slides. Pear-skin-like projections and depressions 22a provided in the area on which the lip for grease 122X slides are schematically illustrated in a circle in FIG. 5. As described in Embodiment 1, the pear-skin-like projections and depressions are projections and depressions that are randomly disposed, which are obtained by electrical discharge machining or blast machining.

The roughness of the pear-skin-like projections and depressions in the area of the surface of the inner ring 20 on which the lip for grease 122X slides is larger than the roughness of the pear-skin-like projections and depressions in the area of the surface of the inner ring 20 on which the lip for foreign object slides. Specifically, the ten-point average height of irregularities of the pear-skin-like projections and depressions provided in the area on which the lip for foreign object slides is 10 μm, while the ten-point average height of irregularities of the pear-skin-like projections and depressions 22a provided in the area on which the lip for grease 122X slides is larger than 10 μm. Note that it is difficult to control the ten-point average height of irregularities of the pear-skin-like projections and depressions in the order of μm due to limitation of the fabrication method. In view of this, the ten-point average height of irregularities of the pear-skin-like projections and depressions 22a provided in the area on which the lip for grease 122X slides is 15 μm or larger. Note that, as described in Embodiment 1, the upper limit of the ten-point average height of irregularities of the pear-skin-like projections and depressions 22a is about 60 μm from the viewpoint of the fabrication method or the like.

The hub bearing of the present embodiment can achieve the similar effect as that of Embodiment 1 described above. Note that the effect is expected to be obtained if the ten-point average height of irregularities of the pear-skin-like projections and depressions 22a provided in the area of the surface of the inner ring 20 on which the lip for grease 122X slides is larger than 10 μm (e.g., 12 or 13 μm) as described in Embodiment 1. Further, the similar effect is expected to be obtained if the ten-point average height of irregularities of the pear-skin-like projections and depressions 22a provided in the area of the surface of the inner ring 20 on which the lip for grease 122 slides is larger than 10 μm and the ten-point average height of irregularities of the pear-skin-like projections and depressions provided in the area on which the lip for foreign object (the side lip 121Xa and the middle lip 121Xb) slides is equal to that of the area on which the lip for grease slides as described in Embodiment 1.

Embodiment 3

Figure 6:
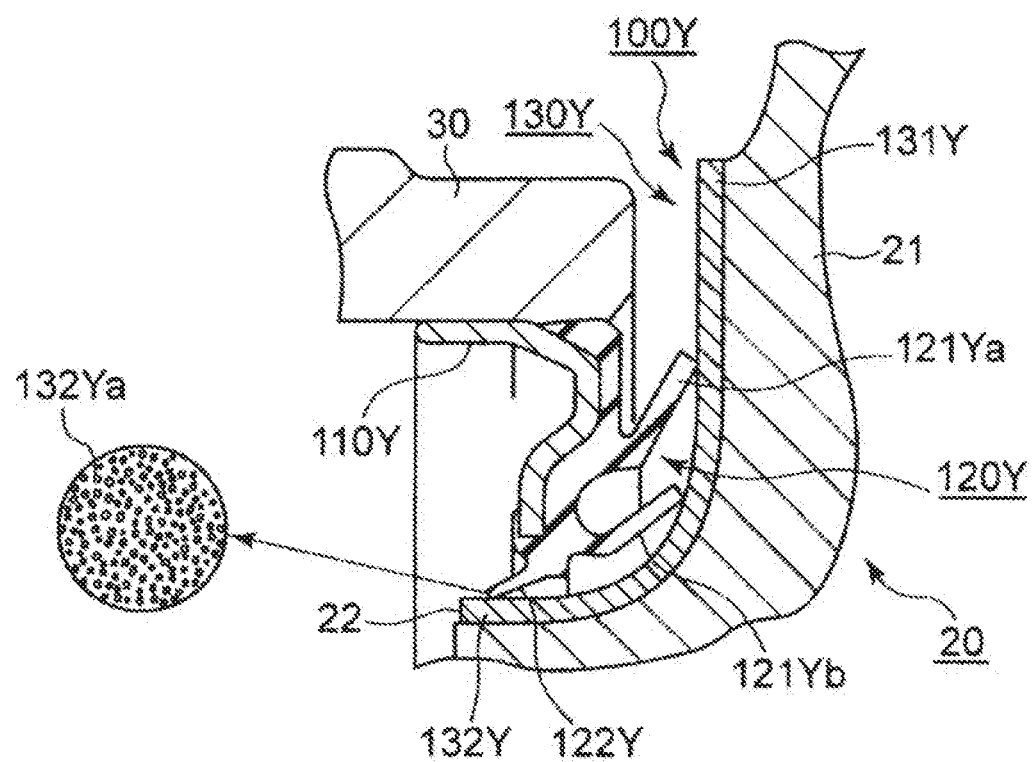
FIG. 6 is a partially enlarged view of a schematic cross-sectional view of the hub bearing to which the sealing device according to Embodiment 3 of the present disclosure is applied.

FIG. 6 illustrates Embodiment 3 of the present disclosure. The present embodiment relates to a configuration where the pear-skin-like projections and depressions are provided on the slinger, while above described Embodiment 1 relates to a configuration where the pear-skin-like projections and depressions are provided on the seal lip of the seal body.

The overall configuration of the hub bearing is same as above described embodiment and hence further explanation will be omitted. FIG. 6 is a partially enlarged view of a schematic cross-sectional view of the hub bearing to which the sealing device of Embodiment 3 is applied. FIG. 6 illustrates a cross-sectional view obtained by cutting the hub bearing by a plane including the central axis of rotation of the inner ring. A description about a sealing device 100Y on the tire side (A), which is one of a pair of sealing devices provided in the hub bearing, will be given as an example (see FIG. 1). The sealing device 100Y has a reinforcement ring 110Y that is fixed to the outer ring 30, a seal body 120Y that is provided integrally with the reinforcement ring 110Y and is made of an elastic body, and a slinger 130Y that is fixed to the inner ring 20. The reinforcement ring 110Y is configured to be fixed to the inner peripheral surface of the outer ring 30 by fitting. The slinger 130Y is configured to be fixed to a portion in the vicinity of the curved surface between the outward flange portion 21 and the outer peripheral surface 22 in the inner ring 20 by fitting. The slinger 130Y includes an outward flange portion 131Y and a cylindrical portion 132Y.

The seal body 120Y has a plurality of seal lips that are slidable on the slinger 130Y. The plurality of seal lips include the lip for foreign object for preventing the entry of the foreign object and a lip for grease 122Y for preventing the leakage of the grease. The lip for foreign object has a side lip 121Ya and a middle lip 121Yb that is provided between the side lip 121Ya and the lip for grease 122Y. Each of the side lip 121Ya and the middle lip 121Yb serving as the lip for foreign object extends radially outward and is slidable on the slinger 130Y. The side lip 121Ya is slidable on an end surface of the outward flange portion 131Y in the slinger 130Y The middle lip 121Yb is slidable on a curved surface between an outer peripheral surface of the cylindrical portion 132Y and the outward flange portion 131Y in the slinger 130Y. The lip for grease 122Y extends radially inward and is slidable on the outer peripheral surface of the cylindrical portion 132Y of the slinger 130Y.

A surface of the slinger 130Y has the pear-skin-like projections and depressions in an area on which the lip for foreign object (the side lip 121Ya and the middle lip 121Yb) slides and in an area on which the lip for grease 122Y slides. Pear-skin-like projections and depressions 132Ya provided in the area on which the lip for grease 122Y slides are schematically illustrated in a circle in FIG. 6. As described in Embodiment 1, the pear-skin-like projections and depressions are projections and depressions that are randomly disposed, which are obtained by electrical discharge machining or blast machining.

The roughness of the pear-skin-like projections and depressions in the area of the surface of the slinger 130Y on which the lip for grease 122Y slides is larger than the roughness of the pear-skin-like projections and depressions in the area of the surface of the slinger 130Y on which the lip for foreign object slides. Specifically, the ten-point average height of irregularities of the pear-skin-like projections and depressions provided in the area on which the lip for foreign object slides is 10 μm, while the ten-point average height of irregularities of the pear-skin-like projections and depressions 132Ya provided in the area on which the lip for grease 122Y slides is larger than 10 μm. Note that it is difficult to control the ten-point average height of irregularities of the pear-skin-like projections and depressions in the order of μm due to limitation of the fabrication method. In view of this, the ten-point average height of irregularities of the pear-skin-like projections and depressions 132Ya provided in the area on which the lip for grease 122Y slides is 15 μm or larger. Note that, as described in Embodiment 1, the upper limit of the ten-point average height of irregularities of the pear-skin-like projections and depressions 132Ya is about 60 μm from the viewpoint of the fabrication method or the like.

The sealing device 100Y of the present embodiment can achieve the similar effect as that of Embodiment 1 described above. Note that, the effect is expected to be obtained if the ten-point average height of irregularities of the pear-skin-like projections and depressions 132Ya provided in the area of the surface of the slinger 130Y on which the lip for grease 122Y slides is larger than 10 μm (e.g., 12 or 13 μm) as described in Embodiment 1. Further, the similar effect is expected to be obtained if the ten-point average height of irregularities of the pear-skin-like projections and depressions 132Ya provided in the area of the surface of the slinger 130Y on which the lip for grease 122Y slides is larger than 10 μm and the ten-point average height of irregularities of the pear-skin-like projections and depressions provided in the area on which the lip for foreign object (the side lip 121Ya and the middle lip 121Yb) slides is equal to that of the area on which the lip for grease slides as described in Embodiment 1.

Embodiment 4

Figure 7:
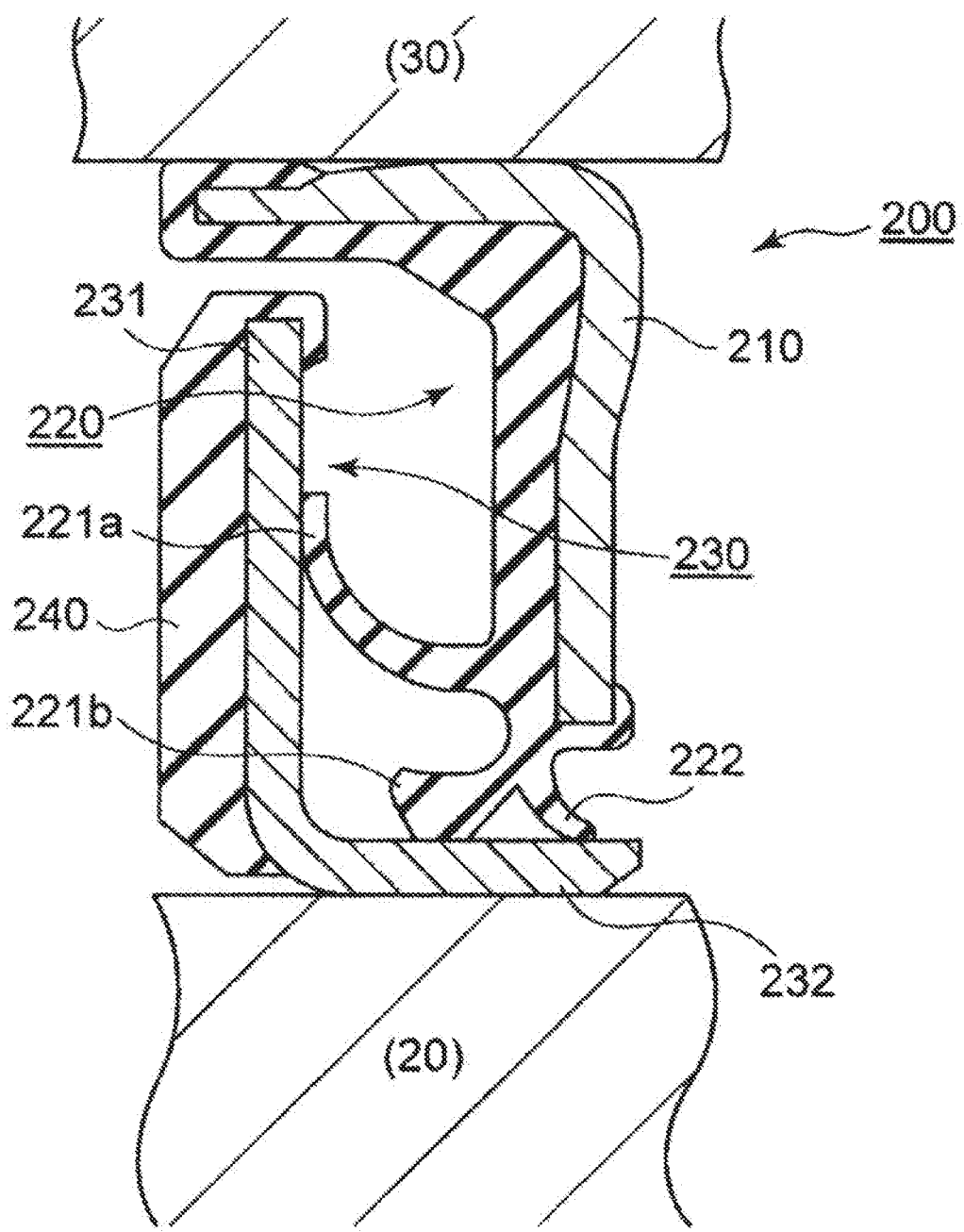
FIG. 7 is a partially enlarged view of a schematic cross-sectional view of the hub bearing to which the sealing device according to Embodiment 4 of the present disclosure is applied.

FIG. 7 illustrates Embodiment 4 of the present disclosure. The present embodiment relates to a sealing device provided on the car body side, while each of above described embodiments relate to a sealing device provided on the tire side, which is one of a pair of sealing devices provided in the hub bearing.

The overall configuration of the hub bearing is same as above described embodiment and hence further explanation will be omitted. FIG. 7 is a partially enlarged view of a schematic cross-sectional view of the hub bearing to which the sealing device according to Embodiment 4 is applied. FIG. 7 illustrates a cross-sectional view obtained by cutting the hub bearing by a plane including the central axis of rotation of the inner ring. A description about the sealing device 200 provided on the car body side (B) will be given as an example, which is one of a pair of sealing devices provided in the hub bearing (see FIG. 1). The sealing device 200 has a reinforcement ring 210 that is fixed to the outer ring 30, a seal body 220 that is provided integrally with the reinforcement ring 210 and is made of an elastic body, and a slinger 230 that is fixed to the inner ring 20. The reinforcement ring 210 is configured to be fixed to the inner peripheral surface of the outer ring 30 by fitting. The slinger 230 is configured to be fixed to the outer peripheral surface of the inner ring 20 by fitting. The slinger 230 includes an outward flange portion 231 and a cylindrical portion 232. Note that the outward flange portion 231 has a rubber portion 240 having a magnetic pole that allows measurement of rotation speed of the inner ring 20.

The seal body 220 has a plurality of seal lips that are slidable on the slinger 230. The plurality of seal lips include the lip for foreign object for preventing the entry of the foreign object and a lip for grease 222 for preventing the leakage of the grease. The lip for foreign object has a side lip 221*a* and a middle lip 221*b* that is provided between the side lip 221*a* and the lip for grease 222. The side lip 221*a* serving as the lip for foreign object extends radially outward and is slidable on the slinger 230. The side lip 221*a* is slidable on an end surface of the outward flange portion 231 in the slinger 230 and the middle lip 221*b* is slidable on an outer peripheral surface of the cylindrical portion 232 in the slinger 230. The lip for grease 222 extends radially inward and is slidable on the outer peripheral surface of the cylindrical portion 232 of the slinger 230.

This configuration of the sealing device 200 may have, as Embodiment 1, pear-skin-like projections and depressions on each of a sliding surface in the lip for foreign object (the side lip 221*a* and the middle lip 221*b*) in the seal body 220 and a sliding surface in the lip for grease 222 in the seal body 220. Further, the roughness of the pear-skin-like projections and depressions provided on the sliding surface of the lip for grease 222 and the roughness of the pear-skin-like projections and depressions provided on the sliding surface of the lip for foreign object may be configured as described in Embodiment 1. This can achieve the similar effect as that of Embodiment 1.

A surface of the slinger 230 of the sealing device 200 may have, as Embodiment 3, the pear-skin-like projections and depressions in an area on which the lip for foreign object (the side lip 221a and the middle lip 221b) slides and in an area on which the lip for grease 222 slides. The roughness of the pear-skin-like projections and depressions provided in the area of the surface of the slinger 230 on which the lip for grease 222 slides and the roughness of the pear-skin-like projections and depressions provided in the area of the surface of the slinger 230 on which the lip for foreign object slides may be configured as described in Embodiment 3. This can achieve the similar effect as that of Embodiment 3.

While each of the above described embodiments is an example of the sealing device applied to the hub bearing, the sealing device of the present disclosure may be applied to other than the hub bearing. That is, a sealing device similar to the sealing device described in each of the above described embodiments may be applied to other uses. For example, in a sealing device used in a differential device or a transmission, a problem where pressure in a sealed space between a lip for foreign object and a lubricant (grease or oil) lip becomes negative can occur. The sealing device according to the present disclosure may be applied to such sealing device.

REFERENCE SIGNS LIST

10 Hub bearing
20 Inner ring
21 Outward flange portion
22 Outer peripheral surface
22a Projections and depressions
30 Outer ring
40 Ball
100, 100X, 100Y, 200 Sealing device
110, 110X, 110Y, 210 Reinforcement ring
120, 120X, 120Y, 220 Seal body
121a, 121Xa, 121Ya, 221a Side lip
121b, 121Xb, 121Yb, 221b Middle lip
122, 122X, 122Y, 222 Lip for grease
122a Projections and depressions
123 Labyrinth seal
130Y, 230 Slinger
131Y, 231 Outward flange portion
132Y Cylindrical portion
132Ya Projections and depressions
232 Cylindrical portion
240 Rubber portion

The invention claimed is:

1. A sealing device configured to seal an annular gap between an inner ring and an outer ring provided in a hub bearing, the sealing device comprising:
   a reinforcement ring configured to be fixed to the outer ring;
   a seal body that is provided integrally with the reinforcement ring and is made of an elastic body; and
   a plurality of seal lips provided in the seal body, the plurality of seal lips being slidable on the inner ring or a slinger fixed to the inner ring, wherein
   the plurality of seal lips include:
      a lip for foreign object configured to prevent entry of a foreign object which extends radially outward and is slidable on the inner ring or the slinger fixed to the inner ring; and
      a lip for grease configured to prevent leakage of grease which extends radially inward and is slidable on the inner ring or the slinger fixed to the inner ring;
   a sliding surface in the lip for foreign object and a sliding surface in the lip for grease have pear-skin-like projections and depressions; and
   roughness of the pear-skin-like projections and depressions provided on the sliding surface of the lip for grease is larger than roughness of the pear-skin-like projections and depressions provided on the sliding surface of the lip for foreign object.

2. The sealing device according to claim 1, wherein a ten-point average height of irregularities of the pear-skin-like projections and depressions provided on the sliding surface of the lip for grease is larger than 10 μm.

3. A sealing device configured to seal an annular gap between an inner ring and an outer ring provided in a hub bearing, the sealing device comprising:
   a reinforcement ring fixed to the outer ring;
   a seal body that is provided integrally with the reinforcement ring and is made of an elastic body;
   a slinger fixed to the inner ring; and
   a plurality of seal lips provided in the seal body, the plurality of seal lips being slidable on the slinger, wherein
   the plurality of seal lips include:
      a lip for foreign object configured to prevent entry of a foreign object which extends radially outward and is slidable on the slinger; and
      a lip for grease configured to prevent leakage of grease which extends radially inward and is slidable on the slinger;
   a surface of the slinger has pear-skin-like projections and depressions in an area on which the lip for foreign object slides and in an area on which the lip for grease slides; and
   roughness of the pear-skin-like projections and depressions in the area on which the lip for grease slides is larger than roughness of the pear-skin-like projections and depressions in the area on which the lip for foreign object slides.

4. The sealing device according to claim 3, wherein a ten-point average height of irregularities of the pear-skin-like projections and depressions in the area of the surface of the slinger on which the lip for grease slides is larger than 10 μm.

5. A hub bearing comprising:
   an inner ring;
   an outer ring; and
   a sealing device configured to seal an annular gap between the inner ring and the outer ring, wherein
   the sealing device includes:
      a reinforcement ring that is configured to be fixed to the outer ring;
      a seal body that is provided integrally with the reinforcement ring and is made of an elastic body; and
      a plurality of seal lips provided in the seal body, the plurality of seal lips being slidable on the inner ring, wherein
   the plurality of seal lips include:
      a lip for foreign object configured to prevent entry of a foreign object which extends radially outward and is slidable on the inner ring; and a lip for grease configured to prevent leakage of grease which extends radially inward and is slidable on the inner ring;

a surface of the inner ring has pear-skin-like projections and depressions in an area on which the lip for foreign object slides and in an area on which the lip for grease slides; and roughness of the pear-skin-like projections and depressions in the area on which the lip for grease slides is larger than roughness of the pear-skin-like projections and depressions in the area on which the lip for foreign object slides.

6. The hub bearing according to claim 5, wherein a ten-point average height of irregularities of the pear-skin-like projections and depressions in the area of the surface of the inner ring on which the lip for grease slides is larger than 10 μm.

7. A hub bearing comprising:
an inner ring;
an outer ring; and
a sealing device configured to seal an annular gap between the inner ring and the outer ring, wherein the sealing device includes:
   a reinforcement ring that is fixed to the outer ring;
   a seal body that is provided integrally with the reinforcement ring and is made of an elastic body; and
   a plurality of seal lips provided in the seal body, the plurality of seal lips being slidable on the inner ring, wherein
the plurality of seal lips include:
   a lip for foreign object configured to prevent entry of a foreign object which extends radially outward and is slidable on the inner ring; and
   a lip for grease configured to prevent leakage of grease which extends radially inward and is slidable on the inner ring; and
a surface of the inner ring has pear-skin-like projections and depressions in an area on which the lip for grease slides, the pear-skin-like projections and depressions having a ten-point average height of irregularities of larger than 10 μm.

8. A sealing device configured to seal an annular gap between a shaft and a housing rotatable relative to each other, the sealing device comprising:
a reinforcement ring fixed to the housing;
a seal body that is provided integrally with the reinforcement ring and is made of an elastic body; and
a plurality of seal lips provided in the seal body, the plurality of seal lips being slidable on the shaft or an annular member fixed to the shaft, wherein
the plurality of seal lips include:

a lip for foreign object configured to prevent entry of a foreign object which extends radially outward and is slidable on the shaft or the annular member fixed to the shaft; and a lip for lubricant configured to prevent leakage of lubricant which extends radially inward and is slidable on the shaft or the annular member fixed to the shaft;

each of a sliding surface in the lip for foreign object and a sliding surface in the lip for lubricant has pear-skin-like projections and depressions thereon; and roughness of the pear-skin-like projections and depressions provided on the sliding surface of the lip for lubricant is larger than roughness of the pear-skin-like projections and depressions provided on the sliding surface of the lip for foreign object.

9. The sealing device according to claim 8, wherein a ten-point average height of irregularities of the pear-skin-like projections and depressions provided on the sliding surface of the lip for lubricant is larger than 10 μm.

10. A sealing device configured to seal an annular gap between a shaft and a housing rotatable relative to each other, the sealing device comprising:
a reinforcement ring configured to be fixed to the housing;
a seal body that is provided integrally with the reinforcement ring and is made of an elastic body;
an annular member configured to be fixed to the shaft; and
a plurality of seal lips provided in the seal body, the plurality of seal lips being slidable on the annular member, wherein
the plurality of seal lips include:
   a lip for foreign object configured to prevent entry of a foreign object which extends radially outward and is slidable on the annular member; and
   a lip for lubricant configured to prevent leakage of lubricant which extends radially inward and is slidable on the annular member;
a surface of the annular member has pear-skin-like projections and depressions in an area on which the lip for foreign object slides and in an area on which the lip for lubricant slides; and
roughness of the pear-skin-like projections and depressions in the area in which the lip for lubricant slides is larger than roughness of the pear-skin-like projections and depressions in the area on which the lip for foreign object slides.

11. The sealing device according to claim 10, wherein a ten-point average height of irregularities of the pear-skin-like projections and depressions in the area of the surface of the annular member on which the lip for lubricant slides is larger than 10 μm.

* * * * *